Patented June 19, 1951

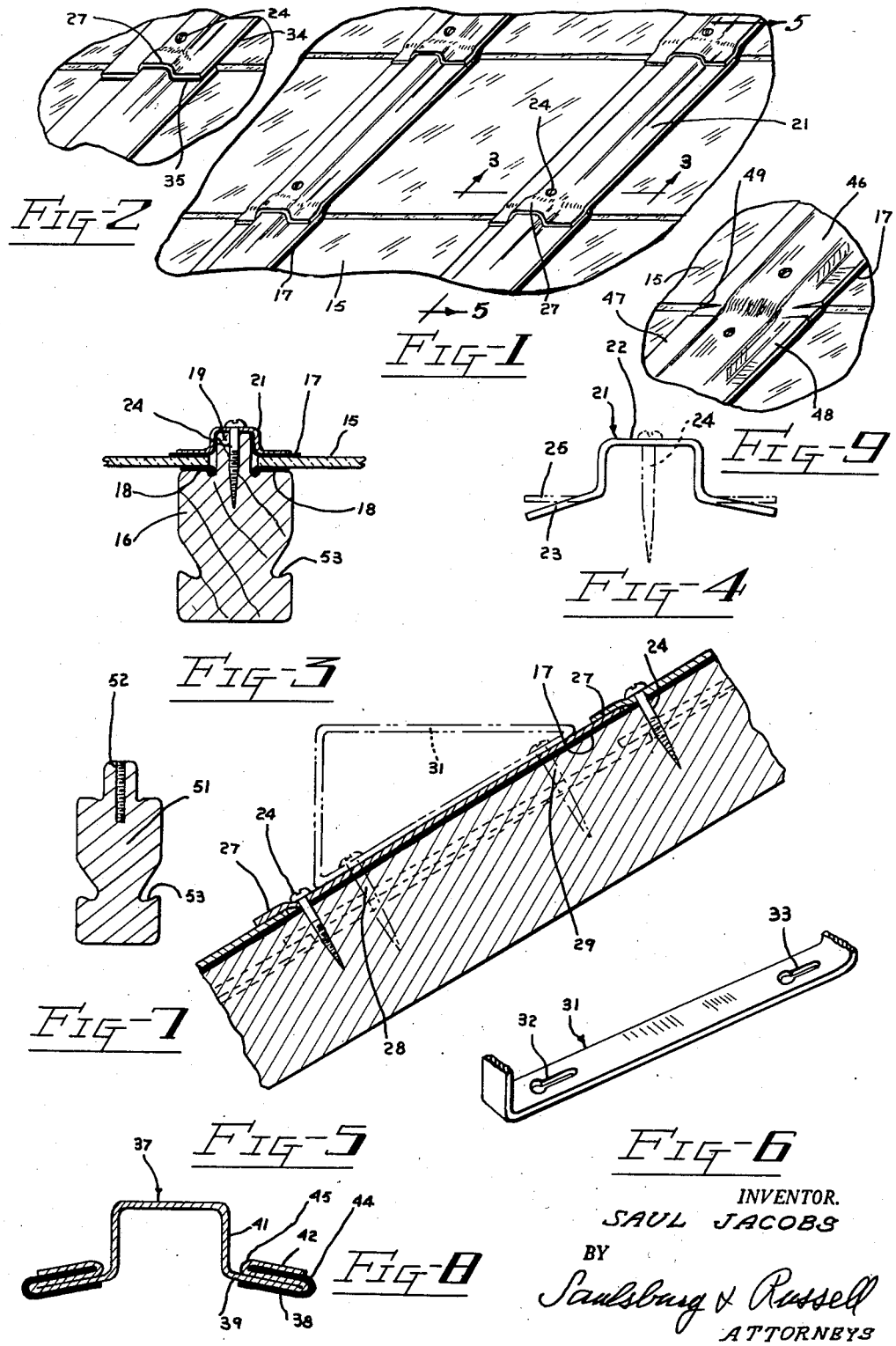

2,557,660

UNITED STATES PATENT OFFICE 2,557,660

BAR CAP FOR GREENHOUSES AND THE LIKE

Saul Jacobs, Forest Hills, N. Y., assignor to Metropolitan Greenhouse Mfg. Corp., Brooklyn, N. Y., a corporation of New York Application May 12, 1948, Serial No. 26,503

1 Claim. (Cl. 189—78)

This invention relates to a bar cap arrangement for greenhouses.

It is an object of the present invention to provide a bar cap arrangement wherein the bar cap is adapted for use with rubber-like sealing strips and wherein the bar cap is formed so that when the cap is applied over the sealing strips and screws extended through the cap into the frame piece, the flanges will be sprung down and the top of the bar cap will be brought into flush contact or engagement with the top face of the frame piece and so that the engagement of the bar cap will be such as to have large flange area portions engaging with the rubber-like sealing strip.

It is another object of the present invention to provide bar cap construction for greenhouses and the like wherein the usual putty and the operations requiring the placing of the putty on the glass is dispensed with and wherein there is provided an arrangement that will last a long time without repair such as is often required where putty is used and applied with a putty knife and wherein the bar cap pieces are so formed that they may overlap one another.

Other objects of the present invention are to provide a bar cap arrangement for greenhouses and the like which is of simple construction, easy to install, inexpensive to manufacture, has long life and efficient in operation.

For other objects and for a better understanding of the invention, reference may be had to the following detailed description taken in connection with the accompanying drawing, in which Fig. 1 is a perspective view of a fragment of a greenhouse roof employing the bar cap arrangement of the present invention.

Fig. 2 is a fragmentary view of a greenhouse roof employing a modified bar cap arrangement.

Fig. 3 is an enlarged transverse sectional view taken on line 3—3 of Fig. 1.

Fig. 4 is an end elevational view of one of the bar caps illustrating the manner in which the flanges are flexed to bring the cap to the home position.

Fig. 5 is an enlarged longitudinal sectional view of the bar cap construction shown in Fig. 1 and taken on line 5—5 thereof.

Fig. 6 is a fragmentary perspective view of the bottom portion of a roof bracket which is employed when making roof repairs.

Fig. 7 is a sectional view of the frame piece made of aluminum or other light weight metal.

Fig. 8 is an enlarged sectional view of a modified form of a bar cap in which the rubber-like weather proofing strip is secured to the flange.

Fig. 9 is a fragmentary perspective view of a part of a roof construction employing a continuous bar cap strip which is notched to provide stop means for maintaining the glass pieces at their elevated locations.

Referring now particularly to Figs. 1 to 5, 15 represents plates of glass which are extended in overlapped fashion and in courses throughout the extent of the roof of a greenhouse or the like. As shown in Fig. 1, a continuous top strip of rubber-like packing, sponge, neoprene or synthetic rubber is extended over the connection of the glass plate 15 with a frame piece 16. This strip of packing material is indicated at 17 and extends over the top of the frame piece and well over and onto the edges of the glass plate. Before setting the plate on the frame pieces, a strip of similar packing material, as indicated at 18, is disposed on the frame piece beneath the edge of the glass plate. These rubber-like strips replace the usual putty material that is more often used. If desired, the strip 18 may be made of rope putty and laid in place along the frame pieces but still using the rubber-like material on the top of the glass plates.

The frame pieces 16 have an upstanding central portion 19 over which the sealing strip 17 is extended. Over this sealing strip and over the central portion 19 there is placed bar caps 21 formed with a central channel portion 22 adapted to receive the frame piece portion 19 and outwardly from which and at the opposite sides of which, there extends flanges 23 which, when the bar cap is free, extend in an inclined manner as shown in full in Fig. 9, but upon the bar caps being installed over the sealing strip 17 and brought down tightly upon the bar or frame piece by screws 24, are flattened to assume the position as shown with dot and dash lines in Fig. 9 as at 25 and as shown in Fig. 3. The channel portion 22 is brought home upon the portion 19 to engage the sealing strip and bring it flush upon the top of the portion 19 of the frame piece and simultaneously the portions of the sealing strips under the flanges are brought into total engagement with the flanges and with the top face of the glass pieces 15 whereby to provide a large and effective sealing area upon the glasspieces.

The bar caps 21 are preferably laid from the bottom of the roof upwardly, overlapping one bar cap over the other until the ridge of the greenhouse is reached. The lower ends of the respective bar caps are enlarged or expanded as indicated at 27 to receive the respective upper ends of the bar pieces and to allow the portions of the flanges lying over the flanges of the bar cap to lie flush thereon and at the same time to provide a stop shoulder within the bar cap lying on top from sliding downwardly as the installation is being made and to permit the sealing strip when disposed in sections as shown in Fig. 2 to be brought tightly upon the flanges of the bottom cap. The channel portion 22 is preferably of less height adjacent the expanded end of the cap than at its upper end over which the expanded end of the succeeding bar cap is placed. This permits a more effective union of the ends of the caps at the overlapping edge of a glass piece. The channel at the upper end is raised so that it can better accommodate the expanded end of the succeeding cap. Inasmuch as the bar caps overlap one another, one screw 24 for each cap is sufficient.

At intervals throughout the extent of the roof, screws 28 and 29 may be extended through a bar cap so that their heads can project upwardly to receive a bracket support 31 for a plank or platform on which workmen may be supported when making repairs on the greenhouse roof. The bottom of the bracket has key hole slots 32 and 33 for respectively receiving the heads of the screws 28 and 29, Figs. 5 and 6.

Instead of providing the sealing strip as a continuous piece, as with the arrangement shown in Fig. 1, the sealing strip may be divided into lengths equal to the length of each bar cap and disposed beneath the bar caps in the manner as shown in Fig. 2. In this arrangement, the enlarged end 27 will have sealing strip material beneath it and this sealing strip will overlie the top end of a bar cap whereby the entire bottom face of a single bar cap is covered with sealing strip material. If desired, this sealing strip may be connected to the bar cap before the same is installed on the roof as by an adhesive or vulcanization. The sealing strip for each bar cap is indicated at 34 and the same overlies the top of a bottom bar cap as at 35, Fig. 2.

In Fig. 5, there is shown a bar cap 37 wherein provision is made for the securement of a sealing strip 38 to flange portions 39 extending outwardly from a channel portion 41. The flange portion 39 is double bent to provide a folded over top 42 for clinching and clamping the sealing strip. The sealing strip will extend from the top of the flange about the edge of the same and underneath the flange where it can be connected by an adhesive or simply folded loosely beneath the flange as the bar cap is being installed. This bar cap 37 has its flanges inclined outwardly and downwardly when the bar cap is free of its connection with the bar or frame piece of the greenhouse, but the flanges will be brought down in the manner illustrated in Fig. 9 when screws are inserted in the top of the bar cap to bring the top thereof home upon the central portion 19 of the bar. The double bend of the flange 39 comprises folds 44 and 45, with one fold being the reverse of the other.

Referring now to Fig. 9, there is shown a bar cap construction wherein the bar cap extends throughout the height of the roof and is continuous. This bar cap is indicated at 46 and covers a continuous sealing strip 17. In order to retain the glass plates or pieces 15 in their elevated positions, flanges 47 and 48 of the bar cap 46 are notched as indicated at 49. The lower side of the notch is dropped in order to provide a shoulder for retaining the lower edge of the glass plate.

In Fig. 7, there is shown a bar or frame piece which is formed of light weight metal such as aluminum and which bears the general shape of the ordinary wood frame piece but of less sectional area. This bar or frame piece is indicated at 50 and has on its top portion a plurality of tapped holes 52 into which metal screws are extended to secure the bar caps thereto. In the sides of the frame pieces 16 and 51, are disposed grooves 53 for receiving condensation from the glass plates for the purpose of being drained off.

These bar caps can be made by any of the usual methods of forming sheet metal pieces either by die stamping or by rolling. The enlarged end formations can be effected either at the time of the stamping operation or by a swaging operation effected later.

It will be apparent that there has been provided a bar cap which when fixed to a bar or frame piece over a sealing strip will securely cause the glass plates to be sealed and that this seal will have long life and the usual putty work which so often has to be done with the prior constructions is dispensed with. Once the bar cap has been fixed and there is no need to remove a glass plate, the seal should last the length of the life of the greenhouse.

While the description has been made with reference to the use of these bar caps for greenhouse constructions, it will be understood that the arrangement has equal application upon other window arrangements such as sky lights, hatches, storm sash and so forth.

While various changes may be made in the detail construction, it shall be understood that such changes shall be within the spirit and scope of the present invention as defined by the appended claim.

I claim:

A bar cap adapted for use with window glass arrangements comprising a channel portion adapted to be extended over a frame piece for securement thereto, flange portions extending from the opposite sides of the channel portion, said flange portions being respectively bent inwardly upon themselves to have metal to metal contact and thence bent outwardly to provide gripping means, strips extending into the gripping means of the flange and bent over the sides thereof and lying against the under face of the flange portions for engagement with glass forming a part of the window arrangement.

SAUL JACOBS.

REFERENCES CITED

The following references are of record in the file of this patent:

UNITED STATES PATENTS

| Number | Name | Date |
|---|---|---|
| 968,737 | Brogden | Aug. 30, 1910 |
| 979,631 | Yeager | Dec. 27, 1910 |
| 1,266,613 | Moses | May 21, 1918 |
| 1,368,531 | Yauch | Feb. 15, 1921 |
| 1,468,898 | Candler | Sept. 25, 1923 |
| 1,527,739 | Leach | Feb. 24, 1925 |
| 1,671,349 | Crist | May 29, 1928 |
| 1,931,750 | Blaski | Oct. 24, 1933 |
| 1,996,635 | Axe | Apr. 2, 1935 |
| 2,400,421 | Johnson | May 14, 1946 |

FOREIGN PATENTS

| Number | Country | Date |
|---|---|---|
| 537,587 | Great Britain | 1941 |